United States Patent
Juutinen

(10) Patent No.: US 6,585,901 B2
(45) Date of Patent: Jul. 1, 2003

(54) METHOD OF DRAINING WATER FROM LOW-CONSISTENCY WATER-FIBER SUSPENSIONS

(75) Inventor: Vesa Juutinen, Tampere (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 10/178,118

(22) Filed: Jun. 24, 2002

(65) Prior Publication Data

US 2003/0019595 A1 Jan. 30, 2003

Related U.S. Application Data

(63) Continuation of application No. PCT/FI00/01113, filed on Dec. 19, 2000.

(30) Foreign Application Priority Data

Dec. 23, 1999 (FI) .............................................. 19992779

(51) Int. Cl.[7] .............................................. B01D 37/02
(52) U.S. Cl. ........................ 210/777; 210/778; 210/193; 210/790; 210/434
(58) Field of Search .................................. 210/767, 777, 210/778, 790, 193, 433.1, 434

(56) References Cited

U.S. PATENT DOCUMENTS

| 4,871,793 A | 10/1989 | Nakahara et al. |
| 5,290,454 A | 3/1994 | Dorica et al. |
| 5,753,080 A | 5/1998 | Karvonen |

FOREIGN PATENT DOCUMENTS

| DE | 19624127 | 12/1997 |
| EP | 0 312 512 A1 | 4/1989 |
| SE | 92959 | 10/1938 |

*Primary Examiner*—Robert Popovics
(74) *Attorney, Agent, or Firm*—Alston & Bird LLP

(57) ABSTRACT

A method of draining water from low-consistency water-fiber suspensions, in which the water-fiber suspension is fed to a filtering surface comprising holes. The rougher fibers are first separated from the water-fiber suspension and fed to the filtering surface to form a separate filtering layer and the water-fiber suspension is led to flow through the filtering layer formed by the rougher fibers.

5 Claims, 1 Drawing Sheet

METHOD OF DRAINING WATER FROM LOW-CONSISTENCY WATER-FIBER SUSPENSIONS

CROSS-REFERENCE TO RELATED APPLICATIONS

This application is a Continuation of International Application PCT/FI00/01113, filed Dec. 19, 2000, which designated the U.S. and was published under PCT Article 21 (2) in English, and which is hereby incorporated herein in its entirety by reference.

BACKGROUND OF THE INVENTION

The invention relates to a method of draining water from low-consistency water-fiber suspensions, in which method the water-fiber suspension is led to a filtering surface comprising holes, through which holes water, short fiber material and possible particle-like solids can flow.

In paper-making processes, there are situations in which a fiber-containing water suspension is processed, whose consistency is low, i.e., the quantity of fiber stock is small, the suspension also contains a great deal of short fibers and possibly also particle-like solids derived from filling agents. Concentrating this kind of water-fiber suspension is quite difficult and, in practice, it is not possible to achieve efficiently with present thickeners or filters. This type of water-fiber suspension is obtained for instance by thermo-mechanical processes, whereby the freeness level of the obtained stock is approximately 70–80 ml and its consistency is low, typically approximately 1%. Further, the same situation occurs in processing process water recycled in paper-making processes where when dewatering the web during web formation, short fibers in particular and particle-like solids used in paper-making are left in the water.

SUMMARY OF THE INVENTION

It is an object of the present invention to provide a method by which short fibers and/or filling agents can more efficiently be filtered from the water-fiber suspension, thus producing a cleaner filtrate and circulating water for the process. The method of the invention is characterized in that first the rougher fiber material is separated from said water-fiber suspension, the separated rougher fiber material is led to a filtering surface to form a separate filtering layer, and the water-fiber suspension is fed through the filtering layer, whereby at least a part of the short fiber material and possible particle-like solids remains in the filtering layer formed by the rougher fibers.

In accordance with the invention, the rougher fiber material is first separated from the water suspension and fed to a thickener as a filtering layer and the suspension to be thickened is fed to the thickener or filter in such a manner that it has to flow through the filtering layer thus formed, whereby the fines and the particle-like solids remain in the filtering layer without substantially passing through the filtering surface. This type of rougher fiber material preferably has a freeness value of 200–400 ml, in which case it forms a sufficiently dense layer but still has a good water permeability.

In a preferred embodiment of the invention, two filtering layers are formed of the rougher fiber material, and the suspension is fed between them.

The invention provides the advantage that with a simple supplementary apparatus, it is possible to form of one and the same water-fiber suspension being processed a filtering layer which aids thickening by retaining fine fibers and possible particle-like solids very efficiently, making it thus possible to obtain from the thickener a filtrate whose solids content is even below 30 mg/liter. This way, sufficiently clean filtrate water, i.e., containing only a small amount of fiber material and particle-like solids, is obtained and can be used at various stages of the paper-making process.

BRIEF DESCRIPTION OF THE SEVERAL VIEWS OF THE DRAWINGS

The invention is described in greater detail in the appended drawing in which.

DETAILED DESCRIPTION OF PREFERRED EMBODIMENTS

Figure 1:
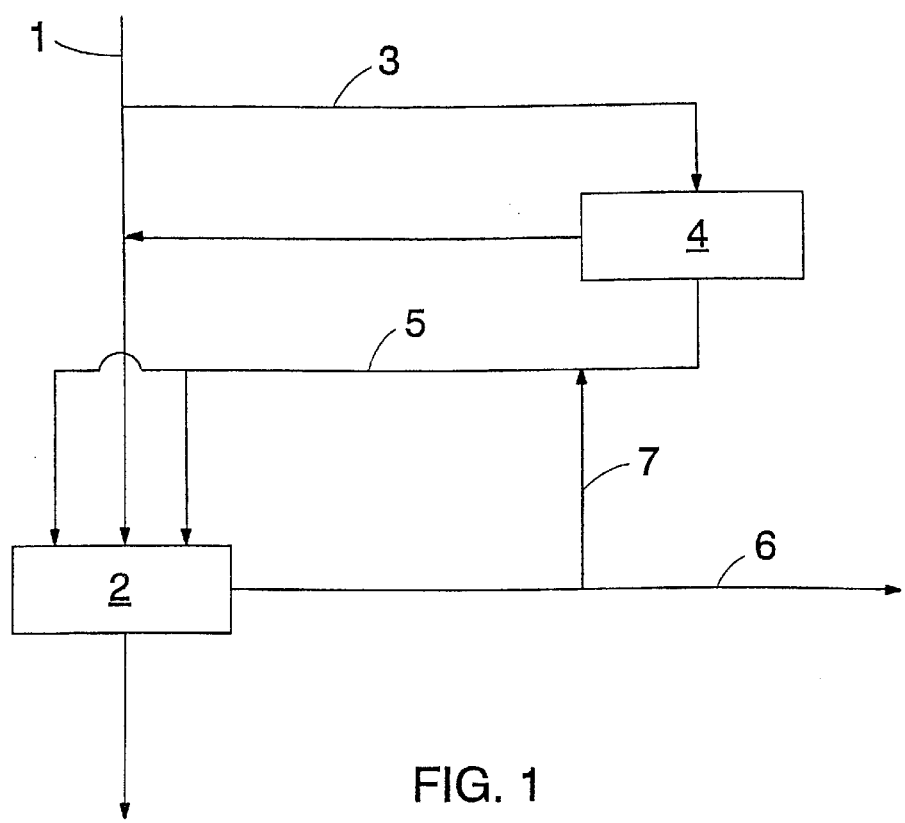
FIG. 1 shows a schematic of the method of the invention.

FIG. 1 shows an inlet channel 1 along which the low-consistency water-fiber suspension being processed is fed into the equipment and led to a filter, such as a thickener 2. Part of the water-fiber suspension, in this case approximately 10%, is led from the inlet channel 1 along a channel 3 to a separator or washer 4 where rougher fibers having a freeness value of approximately 300–400 ml, for example, is separated. Depending on the used equipment or the required investments, the rougher fibers can also be separated directly from the inlet water-fiber suspension, in which case only a required quantity of the rougher fibers is separated and the excess can be returned to the water-fiber suspension. The filtrate, the fibers possibly remaining in it and the particle-like materials separated in the washer 4 are led back to the inlet channel 1, and the rough fiber material separated in the washer 4 is led to a filter, such as the thickener 2, along a channel 5. The rough fiber material is fed into the thickener 2 in such a manner that it forms a filtering layer on the filtering surfaces of the thickener 2, through which layer the water-fiber suspension coming from the channel 1 must flow to pass through the filtering surfaces of the thickener 2. The fine, i.e. short, fiber material and particle-like solids in the circulating water then remain in the rough fiber layer being substantially unable to pass through it, and the filtrate water obtained from the thickener 2 is quite clean. The main part of the filtrate water is led along a channel 6 back to the paper-making process, but a part of it can be returned from the washer 4 along a channel 7 to the thickener 2 to facilitate the feeding-in of material to the channel 5 in which the rough fiber material flows. The filtrate material accumulated on the filtering surfaces of the thickener 2 as well as the fines and particle-like solids filtered to it are removed from the process or led to further processing.

Figures 2, 3:
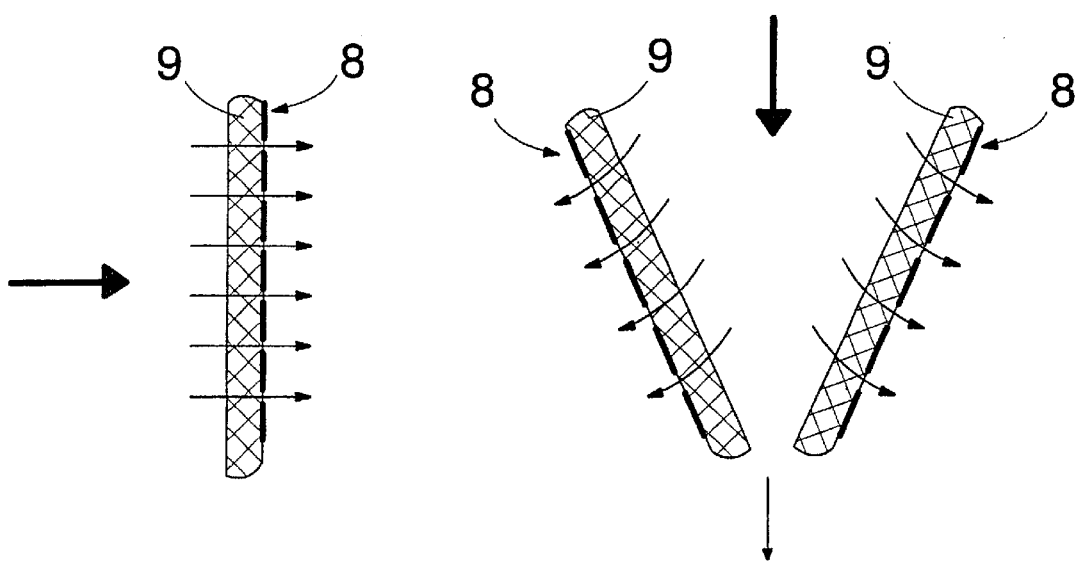
FIG. 2 shows a detailed schematic of filtering.
FIG. 3 shows a detailed schematic of filtering according to another embodiment of the invention.

FIG. 2 shows a schematic of a detail of the filtering performed using the method of the invention. The figure shows a filtering surface 8 which is known per se from different filters and thickeners and whose details need, therefore, not be explained herein. The filtering surface 8 is made of a material which has holes so that a fluid, such as water, and part of the material in the fluid can flow through the holes of the filtering surface from one side of the filtering surface 8 to the other. According to the invention, the filtering surface 8 has a filtering layer 9 formed by the rougher fiber material, the filtering layer forming on top of the filtering surface 8 a denser layer having considerably smaller holes. The water-fiber suspension being filtered or thickened is fed to a filter or thickener to the side of the filtering layer 9 formed by the rougher fiber material, which means that the fiber material in it, including the fine, i.e. short, fibers and possible particle-like solids, cannot pass through the filtering layer, but remain on it while water flows through both the filtering layer 9 and filtering surface 8. This way, the filtrate water obtained from the filtering or thickening contains only small quantities of fibers or particle-like solids, and is thus quite clean for use in different stages of the paper-making process. Correspondingly, the fiber material and possible particle-like solids in the water-fiber suspension can be retained and forwarded to further processing depending on the situation or, if required, removed from the process.

FIG. 3 shows a schematic of another filtering used with the method of the invention. In this case, two filtering surfaces 8 are used to form a gap-like structure. This kind of gap filter formed by means of two filtering surfaces, such as continuous wires, is generally known and obvious to a person skilled in the art, which is why they need not be described in more detail herein. In this embodiment, a filtering layer 9 of the rougher fiber material is formed on both filtering surfaces 9 in such a manner that the filtering layers 9 are between the filtering surfaces 8 facing each other. The water-fiber suspension is then fed into the gap between the filtering layers 9 in such a manner that water flows through both filtering layers to both directions passing through the filtering surfaces while fiber material and possible particle-like solids accumulate on both filtering layers. This produces an efficient filtering/thickening.

In the equipment shown in the figure, the filter/thickener 2 and the washer 4 can be any apparatus suited for the purpose as long as the desired rough-fiber separation is achieved by them and a sufficiently clean filtrate is correspondingly produced for use in the paper-making process by leading it through the filtering layer formed by the rough fibers.

What is claimed is:

1. A method of draining water from a low-consistency water-fiber suspension containing rougher fiber material and short fiber material and possible particulate solids, the method comprising the steps of:

separating rougher fiber material from said water-fiber suspension;

leading the separated rougher fiber material to a filtering surface to form a separate filtering layer of the rougher fiber material on the filtering surface, the filtering surface comprising holes through which water and the short fiber material and possible particulate solids can flow; and feeding the water-fiber suspension to the filtering surface such that the water-fiber suspension is fed through said filtering layer whereby at least part of the short fiber material and possible solids is retained in the filtering layer formed by the rougher fiber material.

2. A method as claimed in claim 1, wherein for forming said filtering layer, fiber material having a freeness value of approximately 200–400 ml is separated from the water-fiber suspension.

3. A method as claimed in claim 1, wherein for draining water, a thickener having a structure formed by two filtering surfaces is used, said filtering layer formed by the rougher fibers is formed on both filtering surfaces, the filtering layers face each other, and the water-fiber suspension is fed between the formed filtering layers in such a manner that water drains through both filtering layers and filtering surfaces.

4. A method as claimed in claim 1, wherein to separate the rougher fibers, a first part of the water-fiber suspension is diverted from a main flow of water-fiber suspension to a separating apparatus where rougher fibers are separated from the first part and the first part with rougher fibers removed is fed to the filtering surface along with the rest of the main flow of water-fiber suspension.

5. A method as claimed in claim 4, wherein a portion of filtrate water drained through the filtering surface is returned to aid in leading rougher fiber material separated in the separating apparatus to the filtering surface.

* * * * *